US009086852B2

(12) United States Patent
Johnson et al.

(10) Patent No.: US 9,086,852 B2
(45) Date of Patent: Jul. 21, 2015

(54) FASTENING TECHNIQUES FOR ELECTRONIC DEVICES

(71) Applicant: Intel Corporation, Santa Clara, CA (US)

(72) Inventors: Patrick S. Johnson, Olympia, WA (US); Robert R. Atkinson, Jr., Chandler, AZ (US); Tod A. Byquist, Federal Way, WA (US); Ben M. Broili, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 296 days.

(21) Appl. No.: 13/725,705

(22) Filed: Dec. 21, 2012

(65) Prior Publication Data
US 2014/0177152 A1 Jun. 26, 2014

(51) Int. Cl.
*G06F 1/16* (2006.01)

(52) U.S. Cl.
CPC ......... *G06F 1/1662* (2013.01); *Y10T 29/49002* (2015.01); *Y10T 29/49948* (2015.01)

(58) Field of Classification Search
None
See application file for complete search history.

(56) References Cited

U.S. PATENT DOCUMENTS

| | | | | |
|---|---|---|---|---|
| 4,375,018 A * | 2/1983 | Petersen | ............... | 200/5 A |
| 5,483,418 A * | 1/1996 | Hosoi | ............... | 361/679.55 |
| 5,510,953 A | 4/1996 | Merkel | | |
| 5,519,169 A * | 5/1996 | Garrett et al. | ............... | 174/371 |
| 5,587,878 A * | 12/1996 | Tsai et al. | ............... | 361/679.57 |
| 5,848,718 A * | 12/1998 | Colwell | ............... | 220/4.02 |
| 5,879,115 A * | 3/1999 | Medal | ............... | 411/82 |
| 6,064,564 A * | 5/2000 | Song et al. | ............... | 361/679.09 |
| 6,180,883 B1 * | 1/2001 | Copeland | ............... | 174/656 |
| 6,262,887 B1 * | 7/2001 | Lee | ............... | 361/679.27 |
| 6,347,044 B1 * | 2/2002 | Won et al. | ............... | 361/807 |
| 6,375,026 B1 * | 4/2002 | Sheldrake et al. | ............... | 220/4.02 |
| 6,480,397 B1 * | 11/2002 | Hsu et al. | ............... | 361/814 |
| 6,493,233 B1 * | 12/2002 | De Lorenzo et al. | ............... | 361/752 |
| 6,560,119 B1 * | 5/2003 | Katsuyama et al. | ............... | 361/752 |
| 6,717,799 B2 * | 4/2004 | Hamano et al. | ............... | 361/679.54 |
| 6,738,254 B2 * | 5/2004 | Oogami | ............... | 361/679.08 |

(Continued)

FOREIGN PATENT DOCUMENTS

JP 2002-299860 A 10/2002
KR 10-1999-0081014 A 11/1999

(Continued)

OTHER PUBLICATIONS

International Search Report and Written Opinion received for PCT Patent Application No. PCT/US2013/075701, mailed on Apr. 4, 2014, 15 pages.

*Primary Examiner* — Adrian S Wilson
(74) *Attorney, Agent, or Firm* — International IP Law Group, P.L.L.C.

(57) ABSTRACT

A computing device including fastening features. The computing device may include an upper shell comprising an upper boss protruding from the upper shell, the upper boss defining a cavity. The computing device may include a lower shell comprising a lower boss protruding from the lower shell. The computing device may include a threaded insert including an insert portion received at the cavity of the upper boss. The threaded insert may include a flange portion wider than the insert portion, and a lateral movement reduction feature. The computing device may include a fastener received through the lower boss and through the threaded insert to fasten the upper shell and lower shell to each other.

36 Claims, 14 Drawing Sheets

(56) References Cited

U.S. PATENT DOCUMENTS

| | | | |
|---|---|---|---|
| 7,349,222 B2* | 3/2008 | Kim | 361/758 |
| 8,284,550 B2* | 10/2012 | Wang | 361/679.3 |
| 8,902,573 B2* | 12/2014 | Mizoguchi et al. | 361/679.09 |
| 2003/0162046 A1* | 8/2003 | Kimura et al. | 428/556 |
| 2004/0034994 A1* | 2/2004 | Chang | 29/760 |
| 2004/0190239 A1* | 9/2004 | Weng et al. | 361/683 |
| 2005/0023022 A1* | 2/2005 | Kriege et al. | 174/52.4 |
| 2006/0192730 A1* | 8/2006 | Kim et al. | 345/60 |
| 2007/0201194 A1* | 8/2007 | Chen et al. | 361/680 |
| 2008/0007902 A1* | 1/2008 | Kim | 361/680 |
| 2008/0019085 A1* | 1/2008 | Nakajima | 361/680 |
| 2008/0259537 A1* | 10/2008 | Arisaka et al. | 361/680 |
| 2009/0279238 A1* | 11/2009 | Kobayashi et al. | 361/679.09 |
| 2013/0308261 A1* | 11/2013 | Matsumoto et al. | 361/679.08 |

FOREIGN PATENT DOCUMENTS

| | | |
|---|---|---|
| KR | 10-2007-0121140 A | 12/2007 |
| KR | 10-0926649 B1 | 11/2009 |
| WO | 2014/099934 | 6/2014 |

* cited by examiner

400

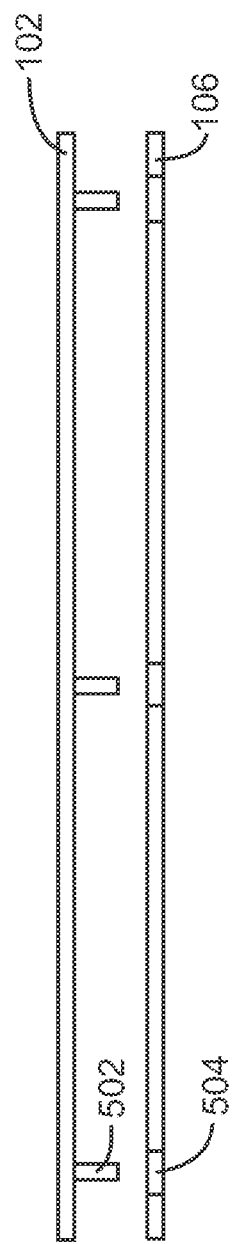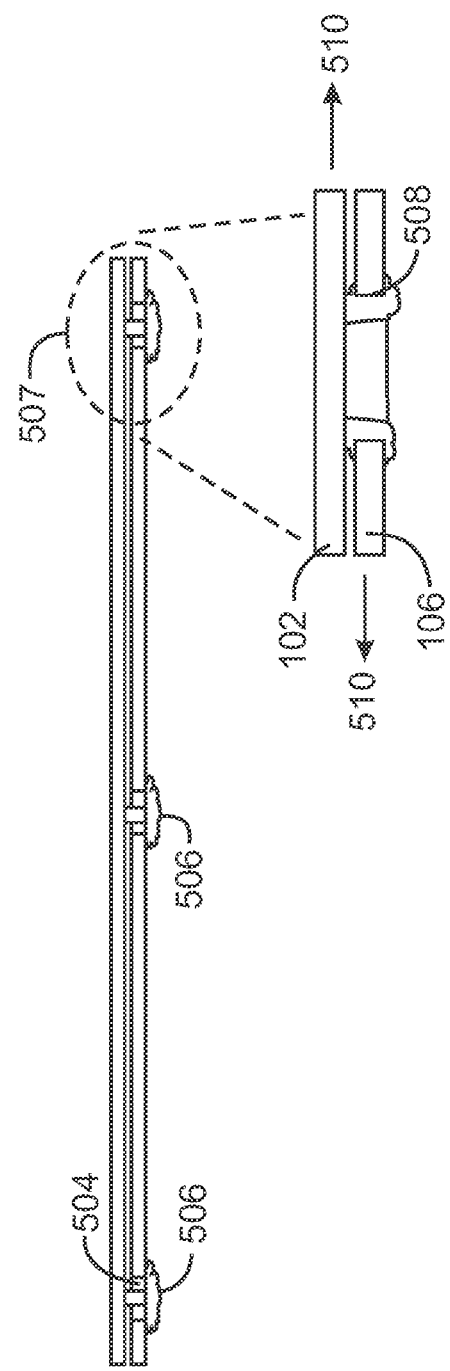

500

500

500

600

700

900

900

1100

1100

1100

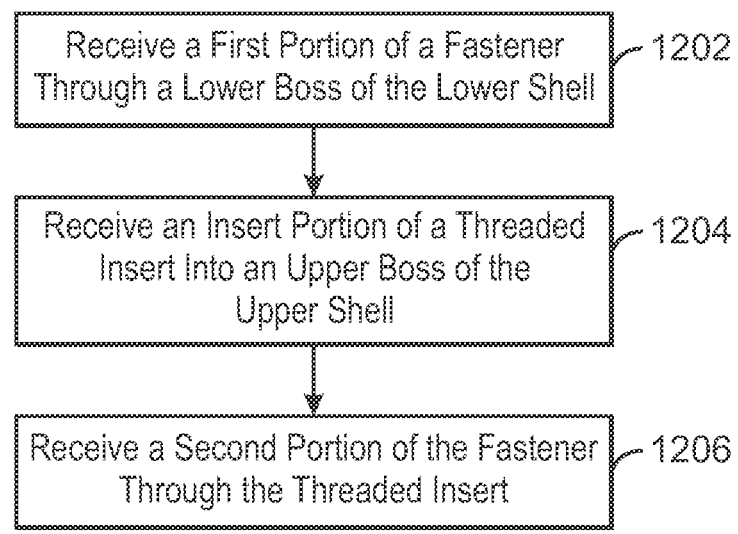

FASTENING TECHNIQUES FOR ELECTRONIC DEVICES

TECHNICAL FIELD

The present disclosure generally relates to fastening techniques used in electronic devices.

BACKGROUND ART

With the proliferation of electronic devices, including computing devices, communication devices, and portable entertainment devices, many computing components have become smaller. Many computing devices are manufactured to be relatively thin and lightweight. In some cases, the more thin and lightweight a computing device becomes, the less sturdy the computing device becomes.

BRIEF DESCRIPTION OF THE DRAWINGS

FIGS. 5A-5B illustrate a deformable post received at the keyboard panel, in accordance with embodiments.

FIG. 12 illustrates a method for reducing lateral movement between components, in accordance with embodiments.

The same numbers are used throughout the disclosure and the figures to reference like components and features. Numbers in the 100 series refer to features originally found in FIG. 1; numbers in the 104 series refer to features originally found in FIG. 2; and so on.

DESCRIPTION OF THE EMBODIMENTS

The present disclosure describes techniques for fastening structural components of a computing device. The computing device may include an upper shell and a lower shell. The upper shell may be fastened to the lower shell via fasteners configured to reduce lateral movement of the upper shell with respect to the lower shell. The upper shell may also be fastened to a keyboard panel. The fastening of the keyboard panel to the upper shell may reduce the lateral movement of the upper shell with respect to the keyboard panel. By reducing lateral movement of various structural components of the computing device, the overall structural integrity can be improved.

Figure 1:
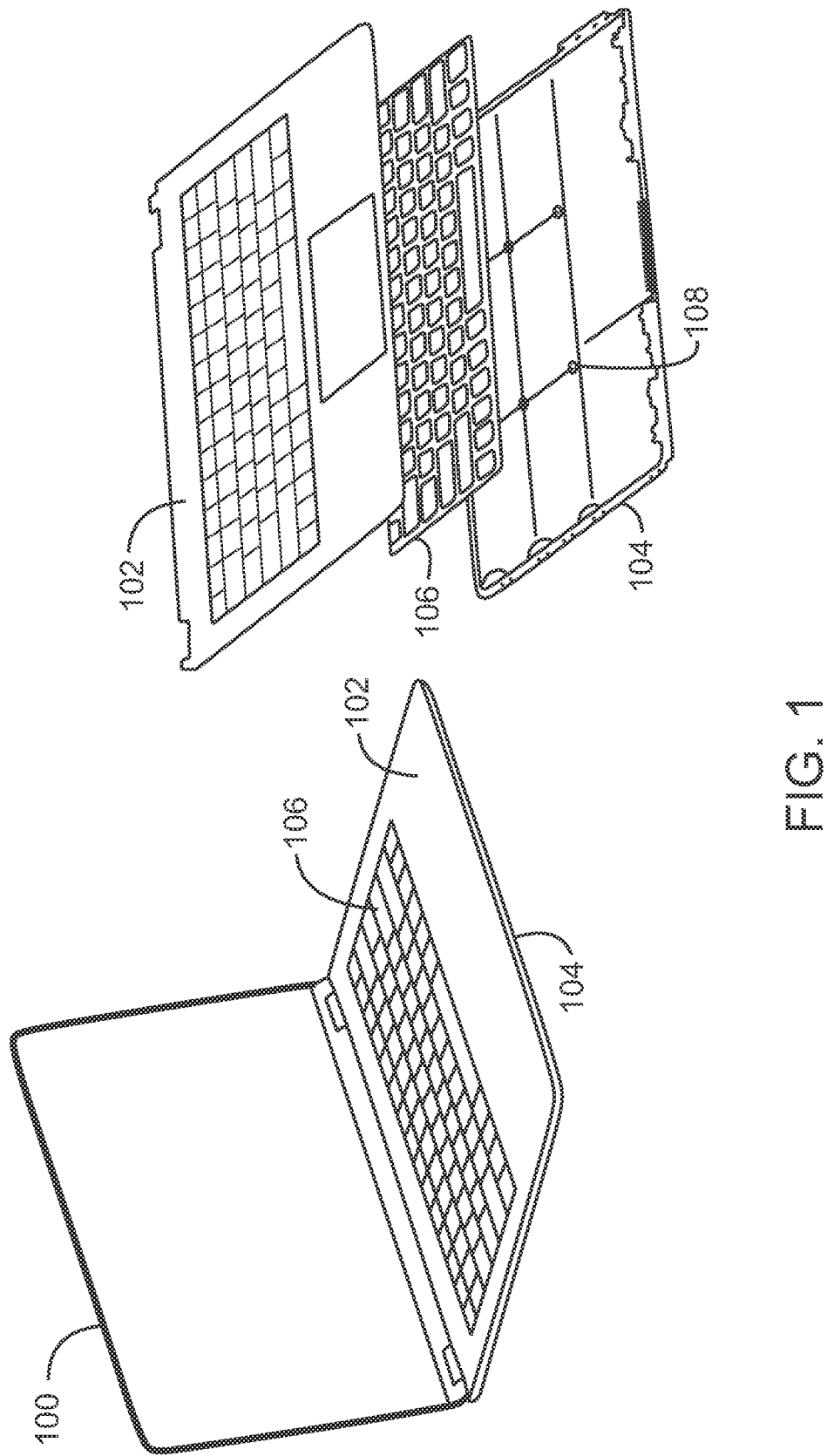
FIG. 1 illustrates a computing device having an upper shell and a lower shell, in accordance with embodiments.

FIG. 1 illustrates a computing device 100 having an upper shell 102 and a lower shell 104, in accordance with embodiments. The computing device 100 may include a keyboard panel 106. The upper shell 102 may be fastened to the lower shell 104 via bosses. A "boss," as referred to herein is a protrusion from either the upper shell 102 or the lower shell 104 to receive fastening components configured to fasten the upper shell 102 to the lower shell 104. Bosses are described in more detail below in reference to FIG. 8.

Figure 2:
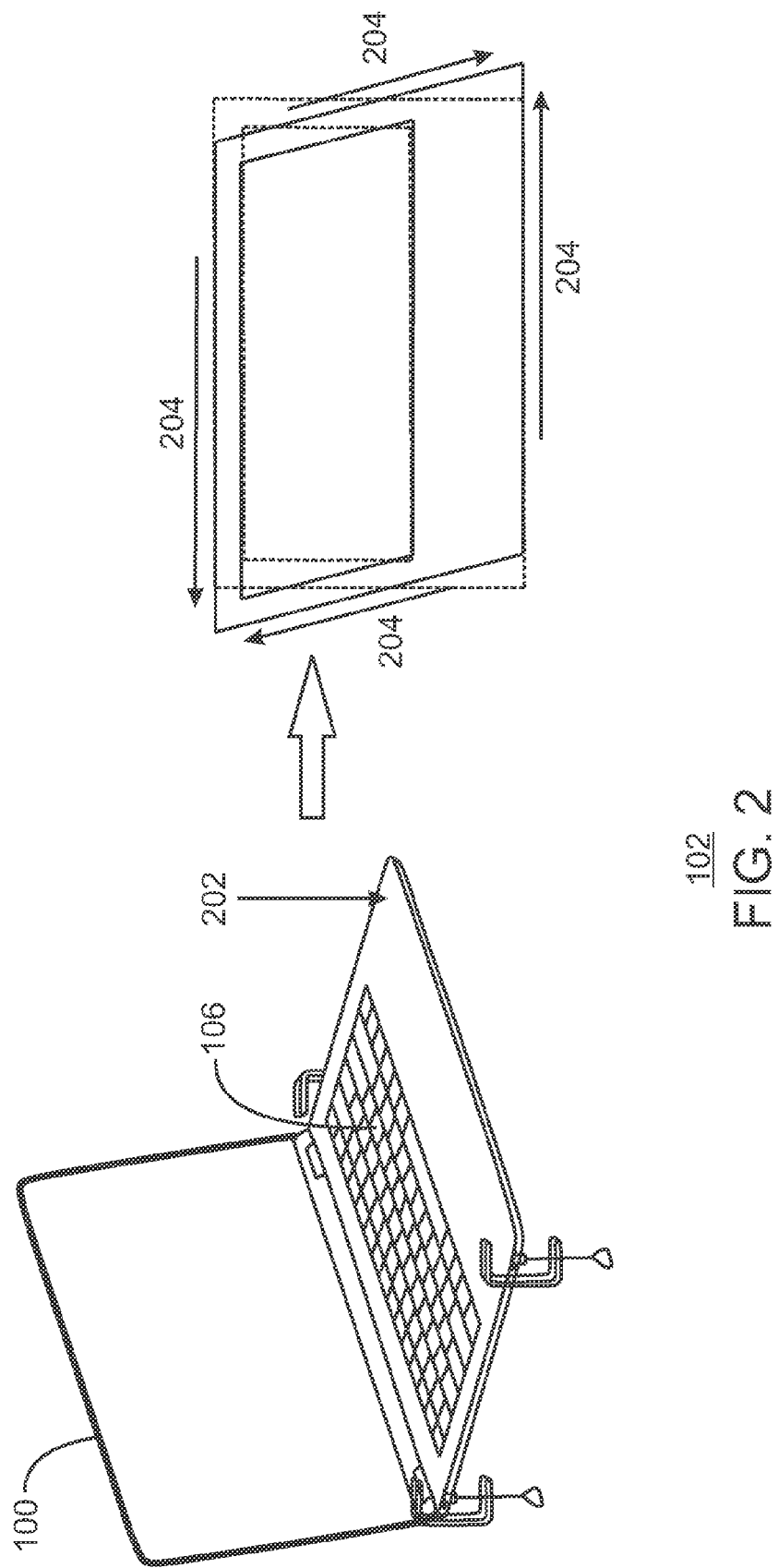
FIG. 2 Illustrates shear load on the upper shell of the computing device, in accordance with embodiments.

FIG. 2 Illustrates shear load on the upper shell 102 of the computing device 100; in accordance with embodiments. As indicated by the arrow 202, pressure may be applied on one corner of the upper shell 102. The pressure applied may create a shear load on the upper shell 102, as indicated by arrows 204.

Figure 3:
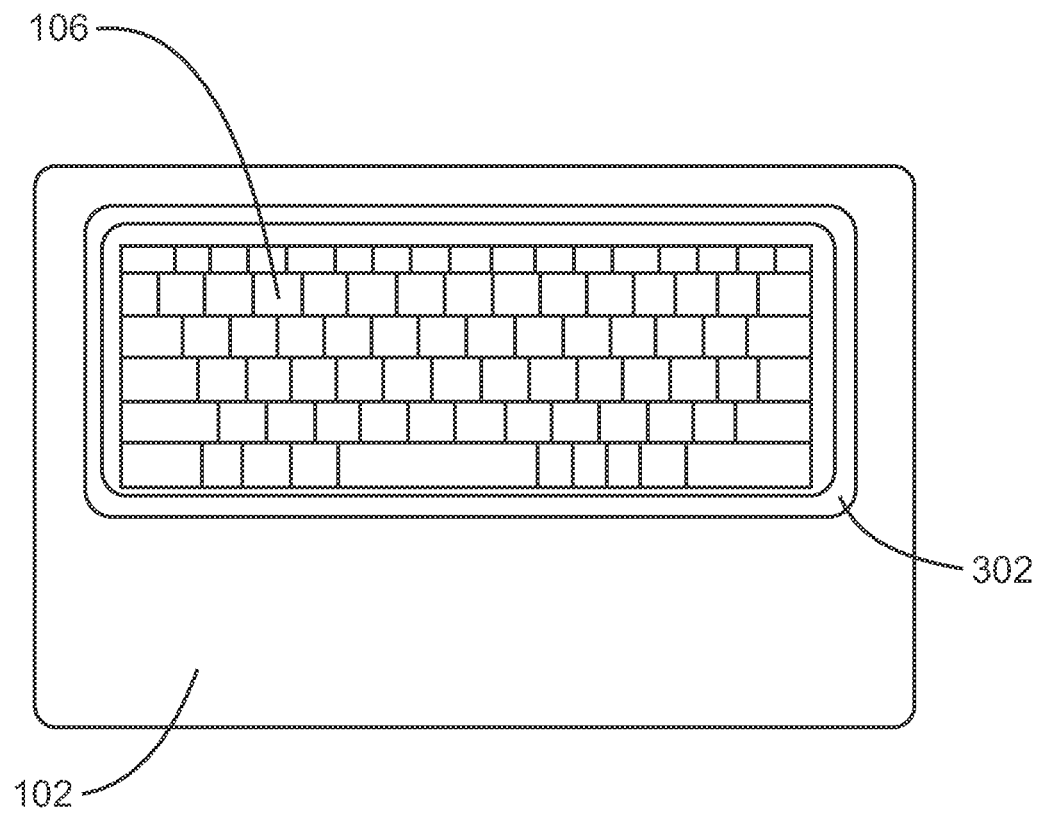
FIG. 3 illustrates an adhesive layer on the perimeter of the keyboard panel, in accordance with embodiments.

FIG. 3 illustrates an adhesive layer 302 on the perimeter of the keyboard panel 106, in accordance with embodiments. The adhesive layer 302 may be a fastening feature to couple the upper shell 102 to the keyboard panel 106. By fastening the keyboard panel 106 to the upper shell 102 via the adhesive layer 302, the computing device 100 may exhibit substantial stiffness and be less responsive to pressure applied to the computing device 100.

Figure 4:
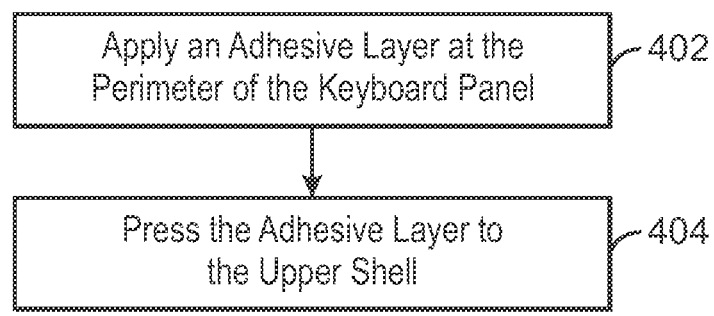
FIG. 4 illustrates a method for fastening a keyboard panel to an upper skin, in accordance with embodiments.

FIG. 4 illustrates a method 400 for fastening a keyboard panel to an upper skin, in accordance with embodiments. The method 400 may include applying, at block 402, an adhesive layer at the perimeter of the keyboard panel. The method 400 may include pressing, at block 404, the adhesive layer to the upper skin.

FIGS. 5A-5B illustrate a deformable post 502 received at the keyboard panel 106, in accordance with embodiments. The keyboard panel 106 may define a through-hole 504 in the keyboard panel 106. In this embodiment, the deformable post 502 may protrude from the upper shell 102. The deformable post 502 may be a fastening feature to couple the upper shell 102 to the keyboard panel 106. As illustrated in FIG. 5B, the deformable post 502 protruding from the upper shell 102 may be configured to be received through the through-hole 504. The deformable post 502 may be deformed to fasten the upper shell 102 to the keyboard panel 106, as indicated by the arrows 506. The dashed circle 507 is a close-up view of the deformable post 502. As shown in the close-up view 507, the deformable post 502 may be deformed against an inner side 508 of the through-hole 504. As indicated by the arrows 510, the upper shell 102 and the keyboard panel 106 may be coupled such that lateral movement is reduced with respect to the upper panel 102 and the lower panel 106.

Figure 5C:
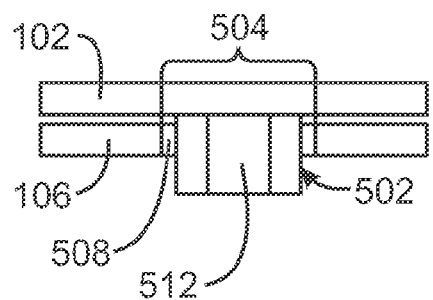
FIGS. 5C-5E illustrate a cavity defined by the deformable post, in accordance with embodiments.
Figure 5D:
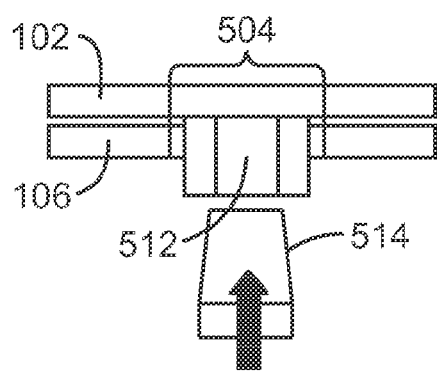
Figure 5E:
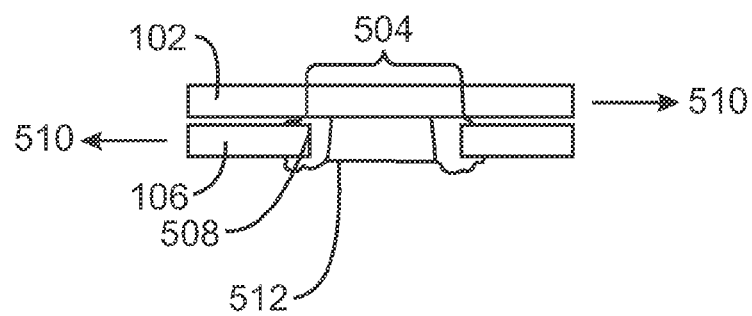

FIGS. 5C-5E illustrate a cavity 512 defined by the deformable post 502, in accordance with embodiments. In these embodiments, the deformable post 502 is relatively large in diameter and defines a cavity 512 such that the deformable post 502 may be deformed against the inner side 508 of the through-hole in the keyboard panel 106. "Relatively large," as referred to herein, is large in comparison to a wall thickness of the deformable post. The wall may be a portion of the deformable post defined by the cavity. In some embodiments, relatively large refers to a deformable post that is 3-5 millimeters in diameter or larger. FIG. 5C illustrates the cavity 512 and the inner side 508 of the through-hole. FIG. 5D illustrates a heating element 514 that may be used to apply heat and force to the deformable post 502 via the cavity 512. FIG. 5E illustrates the deformed deformable post 502 after the heating element 514 has been applied. As illustrated, the deformable post 502 may make contact with the inner side 508 of the through-hole 504. By deforming the deformable post 502 against the inner side 508 of the through-hole 504, lateral movement, as indicated by the arrows 510, may be reduced. A reduction of lateral movement in the upper panel 102 with respect to the keyboard panel 106 may enable a relatively stiffer physical platform for the computing device.

In some embodiments, the inner side 508 of the through-hole 504 may include a tapered or rounded edge. In these embodiments, the tapered or rounded edge may reduce the possibility that pressure at the keyboard panel 106 may cut, break, or otherwise damage the deformable post 502.

Figure 6:
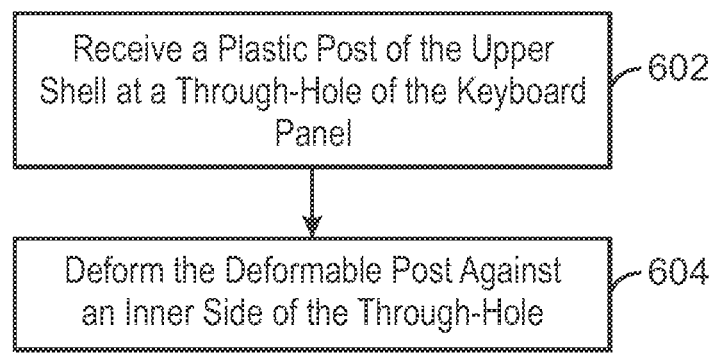
FIG. 6 illustrates a method for fastening a keyboard panel to the upper skin, in accordance with embodiments.

FIG. 6 illustrates a method 600 for fastening a keyboard panel 106 to the upper skin 102, in accordance with embodiments. The method 600 may include receiving, at block 602, a plastic post of the upper shell at a through-hole of the keyboard panel. The method 600 may also include deforming, at block 604, the deformable post against an inner side of the through-hole. In some embodiments, the method 600 may also include tapering an edge at the through-hole. In this embodiment, the edge may be an edge of the inner side of the through-hole.

Figure 7A:
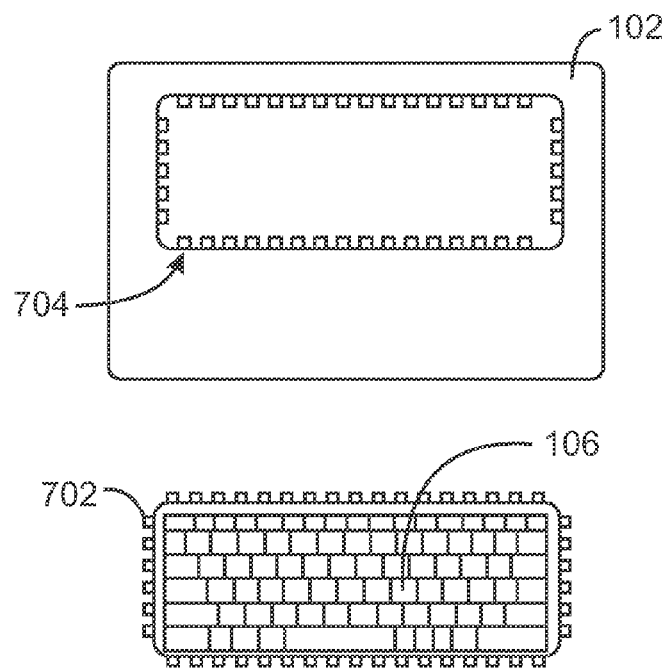
FIGS. 7A-7B illustrate the keyboard panel having two or more tabs in accordance with embodiments.
Figure 7B:
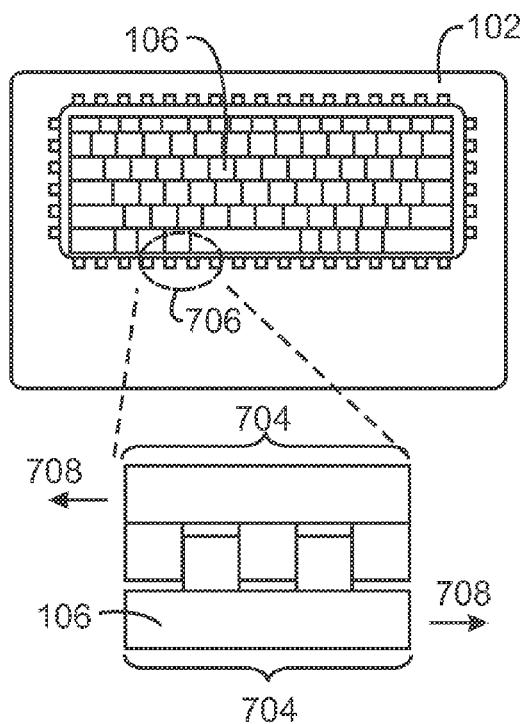

FIGS. 7A-7B illustrate the keyboard panel 106 having two or more tabs 702 in accordance with embodiments. As illustrated in FIG. 7A, the upper shell 102 may also have two or more tabs 704. The two or more tabs 702 on the keyboard panel 106 protrude from the keyboard panel 106 may be configured to be interleaved with the two or more tabs 704 at the upper shell 102, as illustrated in FIG. 7B. The dashed circle 706 illustrates a close-up view of the two or more tabs 702 interleaving with the two or more tabs 704 at the upper shell 102. The interleaved tabs 70, 704 may reduce lateral movement, indicated by the arrows 708, of the upper shell 102 relative to the keyboard panel 106. In some embodiments, the two or more tabs 702 protruding from the keyboard panel 106 may be configured to interleave with the two or more tabs 704 at the upper shell 102 in a press-fit manner. A press-fit manner, as referred to herein, is a fastening between the two or more tabs 702 with the two or more tabs 704 achieved by friction after the tabs 702, 704 are pressed together. The press-fit manner may enable a reduction of lateral movement of the upper shell 102 in relation to the keyboard panel 106.

Figure 7C:
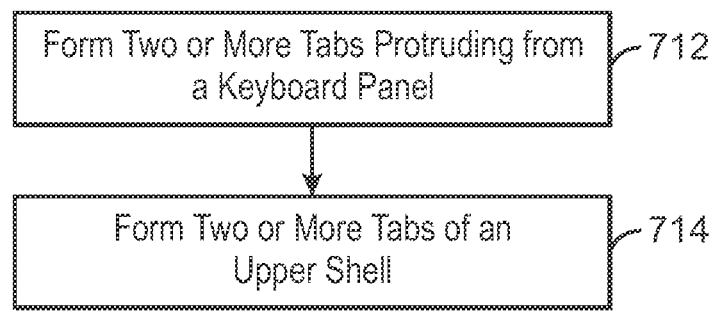
FIG. 7C illustrate a method for fastening a keyboard panel to the upper skin, in accordance with embodiments.

FIG. 7C illustrates a method 710 for fastening a keyboard panel to an upper skin, in accordance with embodiments. The method 710 may include forming, at block 712, two or more tabs protruding from the keyboard panel. The method 710 may include forming, at block 714, two or more tabs at the upper shell. The tabs at the upper shell and at the keyboard panel may be fastened together in a press-fit manner enabling lateral movement of the keyboard panel and the upper shell to be reduced.

Figure 8:
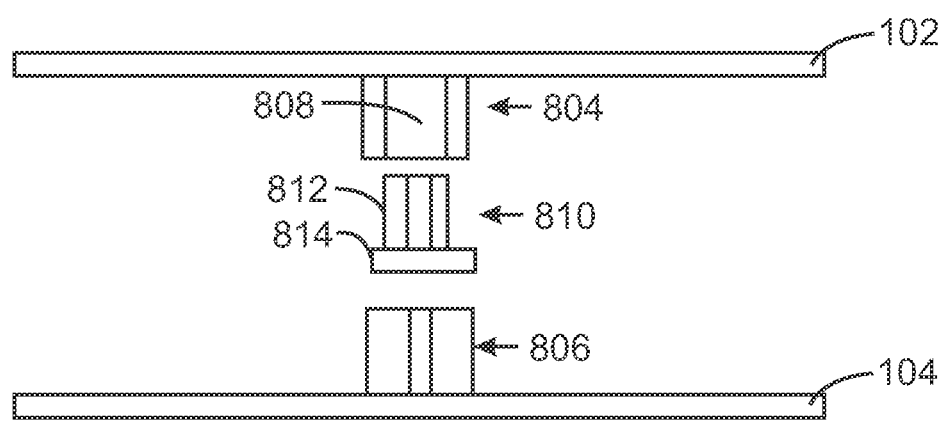
FIG. 8 illustrates the upper shell and the lower shell fastened by a fastener, in accordance with embodiments.

FIG. 8 illustrates the upper shell 102 and the lower shell 104 fastened by a fastener 802, in accordance with embodiments. As discussed above in reference to FIG. 1, the upper shell 102 may be fastened to the lower shell 104 via a fastener 802 to be received through bosses, including the upper boss 804 and the lower boss 806. The upper boss 804 may protrude from the upper shell 102. The lower boss 806 may protrude from the lower shell 104. Each of the upper boss 804 and the lower boss 806 may be integrated with the each of the upper shell 102 and the lower shell 104, respectively. The upper boss 804 may define a cavity indicated by the arrow 808. The cavity 808 may be configured to receive a threaded insert 810. The threaded insert 810 may include an insert portion 812 to be received at the cavity 808 of the upper boss 804. The threaded insert 810 may include a flange portion 814 to be wider than the insert portion 812. The fastener 802 may be received through the lower boss and through the threaded insert to fasten the upper shell 102 and lower shell 104 to each other. The threaded insert 810 may include a lateral movement reduction feature including a protrusion at the interface of the flange portion 814 of the threaded insert 810, discussed in more detail below in reference to FIGS. 9A-9B, FIGS. 10A-10C, and FIGS. 11A-11C.

Figure 9A:
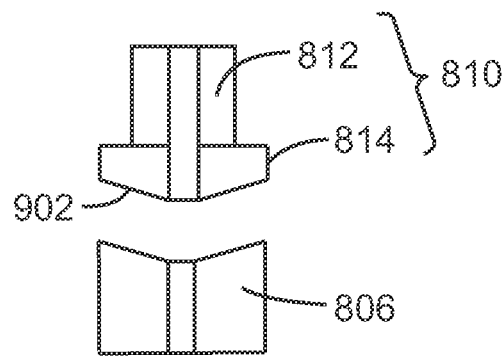
FIGS. 9A-9B illustrate a threaded insert with a lateral movement reduction feature, in accordance with embodiments.
Figure 9B:
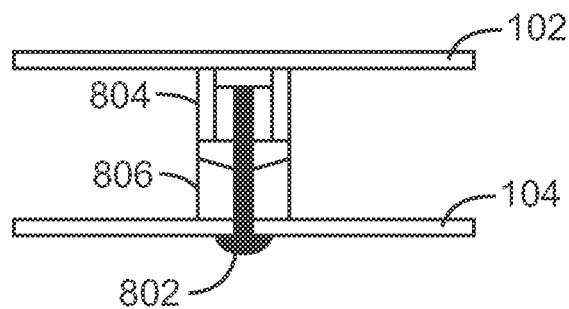

FIGS. 9A-9B illustrate a threaded insert 810 with a lateral movement reduction feature 902, in accordance with embodiments. In this embodiment, the lateral movement reduction feature 902 is a tapered conical protrusion configured to be received at the lower boss 806. The lower boss 806 may be formed to include a conical depression to receive the threaded insert 810. As illustrated in FIG. 9B, the upper shell 102 and the lower shell 104 may be fastened together by combination of the lower boss 806, the upper boss 804, the fastener 802, and the threaded insert 810. The lateral movement reduction feature 902 may be configured to reduce lateral movement between the upper shell 102 and the lower shell 104 respectively.

Figure 10A:
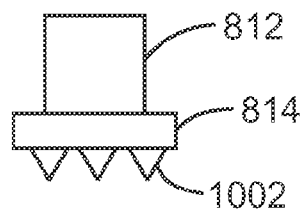
FIGS. 10A-10C illustrate a threaded insert with a lateral movement reduction feature protruding from a flange of the threaded insert, in accordance with embodiments.
Figure 10B:
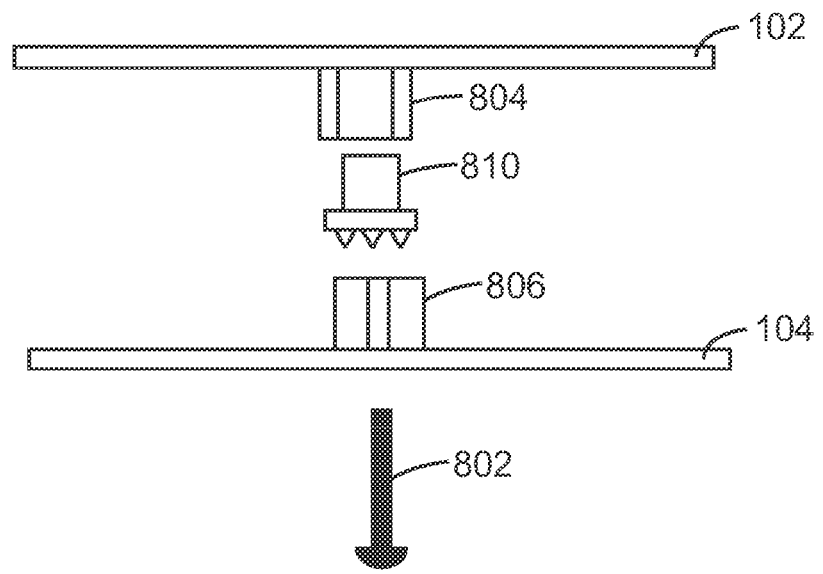
Figure 10C:
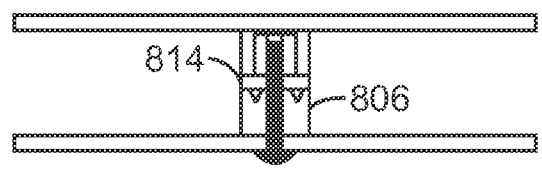

FIGS. 10A-10C illustrate a threaded insert 810 with a lateral movement reduction feature 1002 protruding from the flanged portion 814 of the threaded insert 810, in accordance with embodiments. In this embodiment, the lateral movement reduction feature 1002 is one or more protrusions from the flanged portion 814 of the threaded insert 810. As illustrated in FIG. 10A, the lateral movement reduction feature 1002 may include teeth protruding from a downward face of the flanged portion 814. As illustrated in FIG. 10B, the threaded insert 810 may be received at the upper boss 804, and the fastener 802 may be received through the lower boss 806 and the threaded insert 810 into the upper boss 804. As illustrated in FIG. 10C, the lateral movement reduction feature 1002 may be received into the lower boss 806. In embodiments, the lateral movement reduction feature 1002 may be composed of a material relatively harder than the material of the lower boss. For example, the lateral movement reduction feature may be a metal protrusion at the flanged portion 814. The lower boss 806 includes a deformable plastic to receive the metal protrusion by deforming the plastic at the lower boss 806. As the fastener 802 is tightened, the metal protrusion of the lateral movement reduction feature 902 may be impinge into the lower boss 806, and may thereby enable substantial reduction in lateral movement of the upper shell 102 with respect to the lower shell 104.

Figure 11A:
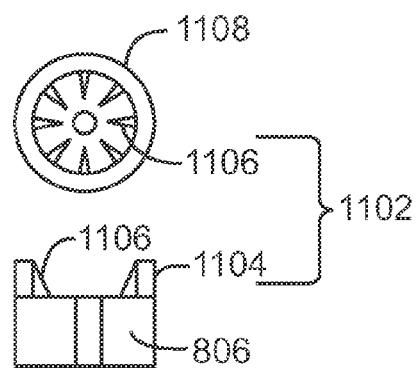
FIGS. 11A-11C illustrate a lower boss having a lateral movement reduction feature at the lower boss, in accordance with embodiments.
Figure 11B:
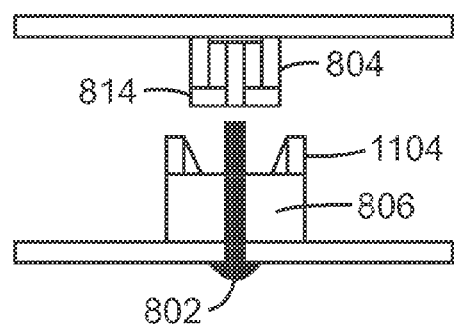
Figure 11C:
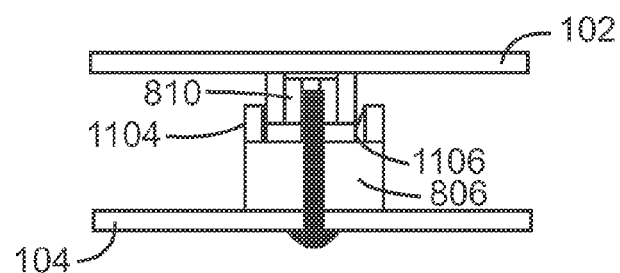

FIGS. 11A-11C illustrate a lower boss 806 having a lateral movement reduction feature 1102 at the lower boss, in accordance with embodiments. In this embodiment, the lateral movement reduction feature 1102 includes a collar 1104 and crush-ribs 1106 at the lower boss 806. The top view of the lower boss 806, indicated by the arrow 1108, illustrates that the crush-ribs 1106 may be disposed within the collar 1104 at the lower boss 806. As illustrated in FIG. 11B, the lower boss 806 and the collar 1104 may be wider than the upper boss 804. The collar 1104 may be configured to receive the flange portion 814 of the threaded insert 810. As illustrated by FIG. 11C, by receiving the flange portion 814 at the lower boss 806, the crush-ribs 1106 may be deformed by the flange portion 814 of the threaded insert 810. In some embodiments, only a portion of the crush-ribs 1106 may be deformed, and the un-deformed portion may enable a close-fit between the collar 1104 and the upper boss 804. By receiving the flange portion 814 and at least partially deforming the crush-ribs 1106, lateral movement of the upper shell 102 and the lower shell 104 with respect to each other may be reduced.

FIG. 12 illustrates a method 1200 for reducing lateral movement between components, in accordance with embodiments. The method 1200 may include receiving, at block 1202, a first portion of a fastener through a lower boss of the lower shell. The method 1200 may include receiving, at block 1204, an insert portion of a threaded insert into an upper boss of the upper shell, wherein the threaded insert further comprises a flanged portion to be wider than the insert portion and a lateral movement reduction feature. The method 1200 may include receiving, at block 1206 a second portion of the fastener through the threaded insert.

In embodiments, the lateral movement reduction feature includes a protrusion at the interface of the flange of the threaded insert and the lower boss. The method 1200 may include receiving a protrusion at the flange at the lower boss to reduce lateral movement of the upper boss with respect to the lower boss.

In embodiments, the lateral movement reduction feature includes metal teeth at the interface of the flange portion of the threaded insert and the lower boss. The method 1200 may include receiving a protrusion at the flange at the lower boss to reduce lateral movement of the upper boss with respect to the lower boss.

In embodiments, the lateral movement reduction feature comprises a protrusion of the lower boss including a collar and crush-ribs at the flange of the threaded insert. In this embodiment, the lower boss is wider than the upper boss. The method 1200 comprising forming the protrusion of the lower boss.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A computing device, comprising:
   an upper shell comprising an upper boss protruding from the upper shell, the upper boss defining a cavity;
   a lower shell comprising a lower boss protruding from the lower shell;
   a threaded insert comprising:
      an insert portion received at the cavity of the upper boss;
      a flanged portion wider than the insert portion; and
      a lateral movement reduction feature, wherein the lateral movement reduction feature comprises a protrusion at an interface of the flanged portion of the threaded insert and the lower boss to be received at the lower boss to reduce lateral movement of the upper boss with respect to the lower boss; and
   a fastener received through the lower boss and through the threaded insert to fasten the upper shell and lower shell to each other.

2. The computing device of claim 1, wherein the protrusion comprises a collar and crush-ribs at the lower boss to receive the flanged portion of the threaded insert, wherein the lower boss is wider than the upper boss.

3. The computing device of claim 2, wherein the crush ribs are to deform when the flanged portion is received at the lower boss.

4. The computing device of claim 1, wherein the protrusion comprises a metal protrusion at the flanged portion to be received at the lower boss to reduce lateral movement of the upper boss with respect to the lower boss.

5. The computing device of claim 4, wherein the lower boss comprises a deformable plastic to receive the metal protrusion by deforming the plastic at the lower boss.

6. A method to fasten an upper shell to a lower shell, comprising:
   receiving a first portion of a fastener through a lower boss of the lower shell;
   receiving an insert portion of a threaded insert into an upper boss of the upper shell, wherein the threaded insert further comprises a flanged portion wider than the insert portion and a lateral movement reduction feature;
   receiving a second portion of the fastener through the threaded insert, wherein the lateral movement reduction feature comprises a protrusion at an interface of the flanged portion of the threaded insert and the lower boss; and
   receiving the protrusion at the interface of the flanged portion and the lower boss to reduce lateral movement of the upper boss with respect to the lower boss.

7. The method of claim 6, wherein the lateral movement reduction feature comprises a metal teeth at the interface of the flanged portion of the threaded insert and the lower boss, the method comprising forming metal teeth at the flanged portion to be received at the lower boss.

8. The method of claim 6, wherein the lateral movement reduction feature comprises a protrusion of the lower boss comprising a collar and crush-ribs at the flanged portion of the threaded insert, wherein the lower boss is wider than the upper boss, the method comprising forming the protrusion of the lower boss.

9. The method of claim 8, further comprising deforming the crush ribs when the flanged portion is received at the lower boss.

10. A computing device, comprising:
an upper shell;
a keyboard panel comprising a through-hole; a fastening feature to couple the upper shell to the keyboard panel, the fastening feature comprising a deformable post protruding from the upper shell to be received through the through-hole, and deformed against an inner side of the through-hole; and
a cavity defined within the deformable post, wherein the deformable post is deformed against two or more sides of the keyboard panel by melting the plastic post via a heating element applied to at an inner wall of the cavity.

11. The computing device of claim 10, comprising a tapered edge at the through-hole.

12. The computing device of claim 10, the fastening feature comprising an adhesive layer disposed at a perimeter of the keyboard panel.

13. The computing device of claim 10, the fastening feature comprising two or more tabs protruding from the keyboard panel to be interleaved with two or more tabs at the upper shell.

14. The computing device of claim 13, wherein two or more tabs protruding from the keyboard panel are to interleave with the two or more tabs at the upper shell in a press-fit manner.

15. A method to fasten an upper shell to a keyboard panel, comprising:
receiving a deformable plastic post of the upper shell at a through-hole of the keyboard panel;
coupling the upper shell to the keyboard panel via a fastening feature, the fastening feature comprising the deformable post protruding from the upper shell to be received through the through-hole, and deformed against an inner side of the through-hole and
deforming the deformable plastic post against two or more sides of the keyboard panel by melting the plastic post via a heating element applied to at an inner wall of the cavity.

16. The method of claim 15, comprising:
applying an adhesive layer at a perimeter of the keyboard panel; and
pressing the adhesive layer to the upper shell.

17. An apparatus, comprising:
an upper shell comprising an upper boss protruding from the upper shell, the upper boss defining a cavity;
a keyboard panel comprising through-holes;
a fastening feature to couple the upper shell to the keyboard panel, the fastening feature comprising:
an adhesive layer disposed at the perimeter of the keyboard panel;
a plastic post protruding from the upper shell to be received through the through-holes, and deformed against an inner side of the through-holes; and
two or more tabs protruding from the keyboard panel to be interleaved with two or more tabs at the upper shell;
a lower shell comprising a lower boss protruding from the lower shell;
a threaded insert comprising:
an insert portion to be received at the cavity of the upper boss;
a flanged portion to be wider than the insert portion; and
a lateral movement reduction feature, wherein the lateral movement reduction feature comprises a protrusion at an interface of the flanged portion of the threaded insert and the lower boss to be received at the lower boss to reduce lateral movement of the upper boss with respect to the lower boss; and
a fastener to be received through the lower boss and through the threaded insert to fasten the upper shell and lower shell to each other.

18. The apparatus of claim 17, wherein the protrusion at the interface of the flanged portion and the lower boss comprises metal teeth at the flanged portion and the lower boss comprises a deformable plastic to receive the first protrusion by deforming the plastic at the lower boss.

19. The apparatus of claim 18, wherein the protrusion comprises a collar and crush-ribs at the lower boss to be received at the flanged portion of the threaded insert, wherein the lower boss is wider than the upper boss and the collar defines a cavity at the lower boss to receive the flange.

20. The apparatus of claim 17, further comprising a cavity defined within the plastic post, wherein the plastic post is deformed against the inner side of the through-hole by melting the plastic post via a heating element applied to at an inner wall of the cavity.

21. The apparatus of claim 17, wherein two or more tabs protruding from the keyboard panel are interleaved with the two or more tabs at the upper shell in a press-fit manner.

22. The apparatus of claim 17, wherein the lateral movement reduction feature comprises a tapered edge.

23. The apparatus of claim 17, wherein the through-holes comprise a tapered edge at an inner face of the through-hole.

24. A method to fasten an upper shell to a keyboard panel and a lower shell, comprising:
applying adhesive layer at the perimeter of the keyboard panel and pressing the adhesive layer to the upper skin;
receiving a plastic post of the upper shell at a through-hole of the keyboard panel and deforming the plastic post against an inner side of the through-hole;
receiving two or more tabs protruding from the keyboard panel at two or more tabs of the upper shell;
receiving a first portion of a fastener through a lower boss of the lower shell;
receiving an insert portion of a threaded insert into an upper boss of the upper shell, wherein the threaded insert further comprises a flanged portion to be wider than the insert portion, and a lateral movement reduction feature, wherein the lateral movement reduction feature comprises a protrusion at an interface of the flanged portion of the threaded insert and the lower boss;
receiving the protrusion at the flanged portion at the lower boss to reduce lateral movement of the upper boss with respect to the lower boss; and
receiving a second portion of the fastener through the threaded insert.

25. The method of claim 24, wherein the protrusion at the flanged portion comprises a metal protrusion and the lower boss comprises a deformable plastic to receive the metal protrusion by deforming the plastic at the lower boss.

26. The method of claim 24, wherein the protrusion comprises a protrusion of the lower boss comprising a collar and crush-ribs receivable by the flanged portion of the threaded insert, wherein the lower boss is wider than the upper boss, comprising receiving the flanged portion at the protrusion of the lower boss.

27. The method of claim 26, wherein the crush ribs are to deform when the flanged portion is received at the lower boss.

28. The method of claim 24, wherein the plastic post defines a cavity within the plastic post, wherein deforming the plastic post against the inner side of the through-hole comprises melting the plastic post via a heating element applied to at an inner wall of the cavity.

29. The method of claim 24, comprising interleaving two or more of the tabs at the keyboard panel with two or more of the tabs at the upper shell in a press-fit manner.

30. The method of claim 24, wherein the through-holes comprise a tapered edge at an inner face of the through-hole.

31. The computing device of claim 1, wherein the protrusion of the lateral movement reduction feature comprises a tapered edge to be received at a tapered edge of the lower boss.

32. The method of claim 6, wherein the protrusion of the lateral movement reduction feature comprises a tapered edge to be received at a tapered edge of the lower boss.

33. The computing device of claim 10, wherein the protrusion of the lateral movement reduction feature comprises a tapered edge to be received at a tapered edge of lower boss.

34. The method of claim 15, the fastening feature comprising two or more tabs protruding from the keyboard panel to be interleaved with two or more tabs at the upper shell.

35. The method of claim 34, wherein two or more tabs protruding from the keyboard panel are to interleave with the two or more tabs at the upper shell in a press-fit manner.

36. The method of claim 24, wherein the protrusion of the lateral movement reduction feature comprises a tapered edge.

\* \* \* \* \*